(12) United States Patent
Chou

(10) Patent No.: US 7,036,956 B1
(45) Date of Patent: May 2, 2006

(54) BOTTOM LIGHTING MODULE

(75) Inventor: Shen-Hong Chou, Toufen Township, Miaoli County (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 11/258,050

(22) Filed: Oct. 26, 2005

(30) Foreign Application Priority Data
Jun. 17, 2005 (TW) ............................. 94120267 A

(51) Int. Cl.
*F21V 5/00* (2006.01)

(52) U.S. Cl. .................. 362/246; 362/29; 362/330; 362/355; 361/682; 361/742

(58) Field of Classification Search ............. 362/246, 362/29, 355, 331, 330, 433; 361/682, 742, 361/758, 804, 810; 439/467
See application file for complete search history.

(56) References Cited

U.S. PATENT DOCUMENTS

| 5,254,016 | A | * | 10/1993 | Ganthier ...................... 439/567 |
| 6,377,002 | B1 | * | 4/2002 | Ge et al. ..................... 315/366 |
| 6,493,233 | B1 | * | 12/2002 | De Lorenzo et al. ........ 361/752 |
| 6,871,982 | B1 | * | 3/2005 | Holman et al. ............. 362/331 |
| 6,974,229 | B1 | * | 12/2005 | West et al. .................. 362/227 |
| 2005/0225960 | A1 | * | 10/2005 | Tsai ............................. 362/23 |

* cited by examiner

*Primary Examiner*—Renee Luebke
*Assistant Examiner*—Zahra I. Bennett
(74) *Attorney, Agent, or Firm*—Troxell Law Office, PLLC

(57) ABSTRACT

A bottom lighting module comprises a substrate, a nut, a first diffusion sheet, a support, a second diffusion sheet and at least one light-emitting diode (LED). The nut is set on the substrate. The first diffusion sheet is disposed on the nut. The support comprises a body and a screw. The body further comprises a top end and a bottom face. The screw extends from the bottom face and passes through the first diffusion sheet to joint with the nut. The second diffusion sheet is disposed on the top end of the body. The LED is disposed below the first diffusion sheet.

17 Claims, 3 Drawing Sheets

BOTTOM LIGHTING MODULE

FIELD OF THE INVENTION

The present invention relates to a bottom lighting module, more particularly to a bottom lighting module having a double-layer diffusion sheet.

BACKGROUND OF THE INVENTION

The liquid crystal display (LCD) technology is always applied to the notebook, the mobile phone, the digital camera, the video camera, the PDA, and various portable electronic products. The liquid crystal display panel (LCD panel) is the most essential display part for this domain. One feature of the LCD panel is its need of a back lighting-source. In the large-sized LCD products (above 20 inch), a bottom lighting module is usually used as the back lighting-source of the LCD.

Due to rapid advance in the electronic manufacture technology, a breakthrough in the light emitting diodes (LEDs) helps to improve the display ability of the LCD screens. Since the LED can emit visible light, such as red, blue and green, it can be foreseen in the near future that the LED will replace the high-cost color filters presently used in the LCD screen. In view of lesser power consumption but providing higher lighting efficiency as well as longer service life, the roles of the LED in the LCD production become significantly.

Referring to FIG. 1, a partially fragmentary view of a conventional bottom lighting module 10 is shown to include a back bezel 12, a printed circuit board 13, at least one light emitting diode (LED) 14, a reflective plate 16 and a diffusion sheet 18. As shown, the printed circuit board 13 is electrically connected to the LED 14.

The printed circuit board 13 set on the back bezel 12 has a plurality of holes 131 for mounting the LEDs 14. The LED 14 has an upper light-emitting portion 141 and a lower LED base 142. The light-emitting portion 141 is located above the printed circuit board 13. The LED base 142 is a main heat source of the LED 14, and is located under the printed circuit board 13 so as to avoid its heat to influence the optical efficiency of LED module 10.

The reflective plate 16 adhered to the printed circuit board 13 has a plurality of cavities 161 respective to expose the holes 131 of the printed circuit board 13 as well as the light-emitting portions 141 of the LEDs 14, in which each of the light-emitting portion 141 is protruding to the reflective plate 16. Through the reflective plate 16, the lights of LED 14 can reflect upward and thus make the light to be fully utilized.

The light diffusing plate 18 is mounted on the back bezel 12. By utilizing the difference in reflectivity between the diffusing plate 18 and the air, part of the light hitting the diffusing plate 18 can be reflect reciprocally between the diffusing plate 18 and the reflective plate 16 so as to thoroughly mix the light emitted by the LED 14. Upon such an arrangement, the light leaving the diffusing plate 18 can have homogeneous brightness and color-ness.

FIG. 2 illustrates a partially fragmentary view of a double-layer diffusing plate of a conventional lighting module, in which the LED 14 emits light beams in a sidewise manner and thus majority of the light beams will not be reflected upward. Unlike the previous conventional lighting module 20, this conventional lighting module 20 shown in FIG. 2 has an auxiliary diffusing plate 22 disposed between the reflective plate 16 and the diffusing plate 18, but located much closer to the former such that the auxiliary diffusing plate 22 can provide a wider angle of light reflection. The wider angle of reflection enhances scattering of the light beams so that almost the entire light beams can be used to provide effective brightness. Due to the aforesaid reasons, the conventional LED lighting module of FIG. 2 can provide a better color mixing effect. It is why the LED module of FIG. 2 is preferably selected to display the LCD system.

Presently, the LED module is used only in the small-sized LCD device, such as a handheld PDA with an LCD screen. However, researchers in the LCD manufacturing field are harsh to solve possible difficulties in the LED modules that will be widely employed in the large-sized LCD device some day.

As illustrated in FIGS. 1 and 2, increase in the dimension of the bottom lighting module consequently requires a larger number of LEDs. In other words, sizes of the reflective plate 16, the diffusing plate 18, and the auxiliary diffusing plate 22 must also be increased proportionally. As a consequence of the dimension increase, the middle portion of any aforesaid plate would be vulnerable to bend downward by virtue of its own gravity. The housing has to burden a relatively large amount of weight and subsequently its rigidity would be reduced. In addition, the downward bending of these plates can be aggravated since the reflective plate 16, and the diffusing plates 18, 22 are all made of glass or acrylic materials which are susceptible to bend. The downward bending of these plates within the backlight module can finally result in uneven scattering of light beams in the backlight module, and hence degrading in the display ability of the LCD device would be inevitable.

SUMMARY OF THE INVENTION

The object of the present invention is to provide a back lighting module that has a support member for supporting the reflective and diffusing plates.

In accordance with the present invention, a bottom lighting module can comprise a back bezel, a nut set on the back bezel, a first diffusion sheet disposed on the nut, a printed circuit board being set between the back bezel and the first diffusion sheet and having a hole for passing the nut, at least one light-emitting diode (LED) disposed below the printed circuit board, a supportsupport further comprising a body with a top end and an opposing bottom face and a screw extended from the bottom face and through the first diffusion sheet to joint with the nut, and a second diffusion sheet disposed on the top end of the body.

In another aspect of the present invention, a bottom lighting module can comprise a back bezel, a printed circuit board set on the back bezel, at least one light-emitting diode (LED) disposed below the printed circuit board, a nut set on the printed circuit board, a first diffusion sheet disposed on the nut, a supportsupport comprising a body and a screw that the body further has a top end and an opposing bottom face and the screw extended from the bottom face is sent through the first diffusion sheet to joint with the nut, and a second diffusion sheet disposed on the top end of the body.

BRIEF DESCRIPTION OF THE DRAWING

Other features and advantages of this invention will become more apparent in the following detailed description of the preferred embodiments of this invention, with reference to the accompanying drawings, in which.

DETAILED DESCCRIPTIONS OF THE PREFERRED EMBODIMENTS

Figure 1:
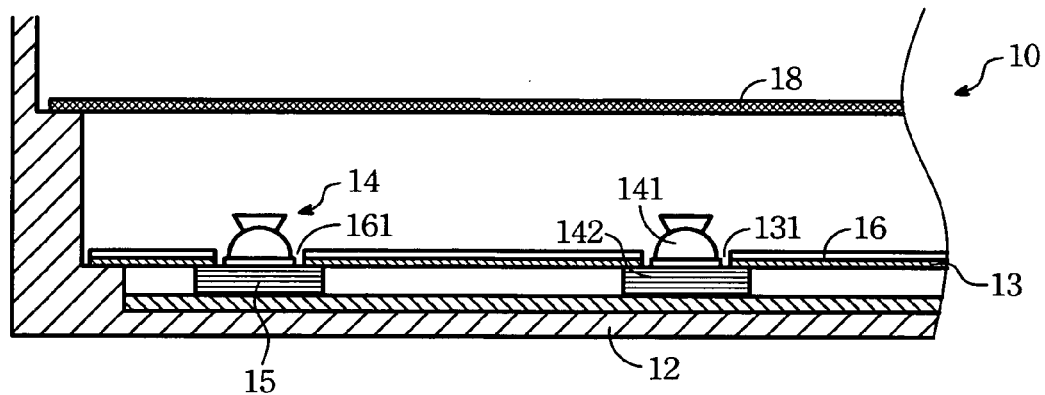
FIG. 1 is a fragmentary sectional view of a conventional bottom lighting module.
Figure 2:
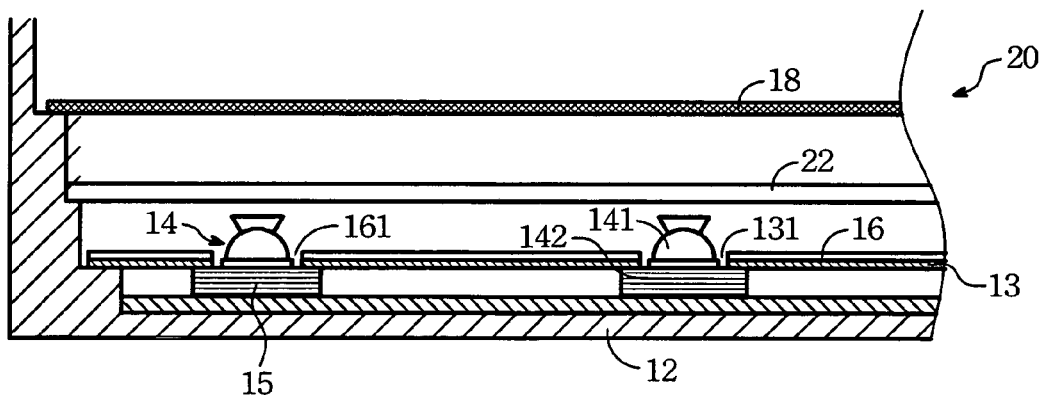
FIG. 2 is a fragmentary sectional view of having double layers diffusing plate of a conventional lighting module.
Figure 3:
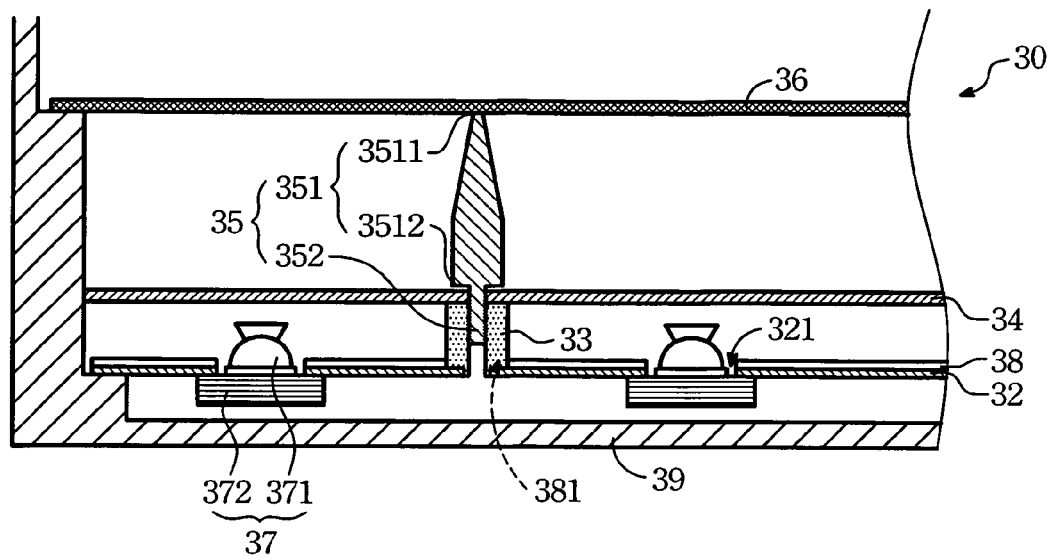
FIG. 3 is a fragmentary sectional view of the preferred embodiment of a bottom lighting module according to the present invention.

Referring to FIG. 3, a fragmentary sectional view of the first embodiment of a bottom lighting module 30 according to the present invention is shown to include a substrate 32, a nut 33, a first diffusion sheet 34, a supportsupport 35, a second diffusion sheet 36 and at least one LED 34.

The substrate 32 can be a printed circuit board (PCB) which is electrically connected to the LED 37 so as to control the activation of the LED 37. The PCB 32 utilizes its fringe sections to mount on the back bezel 39. The PCB 32 has a plurality of holes 321 for allowing respective upper lighting-emitting portions 371 of the LEDs 37 to protrude. The lower portion of the LED 37 is an LED base 372 for mounting the LED 37. As shown, the LED base 372 is located below the PBC 32.

The nut 33 is set on the substrate 32 by thrust-pressing or welding. The first diffusion sheet 34 is carried at the middle portion by the nut 33 and has its fringe section to be set on the sidewall of the back bezel 39. The supportsupport 35 comprises an upper body 351 and a lower screw 352, in which the body 351 further comprises a top end 3511 and a bottom face 3512 and the screw 352 extended downward from the bottom face 3512 to pass through the first diffusion sheet 34 and to finally joint with the nut 33.

Preferably, when the screw 352 and the nut 33 are engaged, the bottom face 312 and the nut 33 are spaced apart from each other by a distance about ranging from 0.01 mm to 5 mm. Such a distance can avoid possible dents on the first diffusion sheet 34 due to overstressing on the screw 352. The second diffusion sheet 36 is disposed on the top end 3511. In fact, the second diffusion sheet 36 uses its fringe section to mount on the back bezel 39.

The reflective plate 38 adhered to the substrate (printed circuit board) 32 has a hole 381 to locate and thus hold the nut 33. The combination of the hole 381 and the nut 33 may help the reflective plate 38 to be fast mounted to its designated position. By providing the reflective plate 38 to upward reflect lights from the LED 37, the lights of the LED 37 can be fully utilized to brighten the LCD.

This invention of the bottom lighting module 30 described above is formed as a double-layer diffusion sheet structure, including the first diffusion sheet 34 and the second diffusion sheet 36 to strengthen LED color mixing effect. The first diffusion sheet 34 is disposed closer to the reflective plate 38 than the second diffusion sheet 36, so that the light beams emitted from the LED 37 can hit the first diffusion sheet 34 at a wider angle of incidence. Thereby, the first diffusion sheet 34 can easily and thoroughly diffuse the entire portion of the light beams. By providing the arrangement of the lower reflective plate 38, the middle first diffusion sheet 34 and the upper second diffusion sheet 36, two light-mixing spaces can be obtained to help achieve a conclusive color mixing effect.

Figure 4:
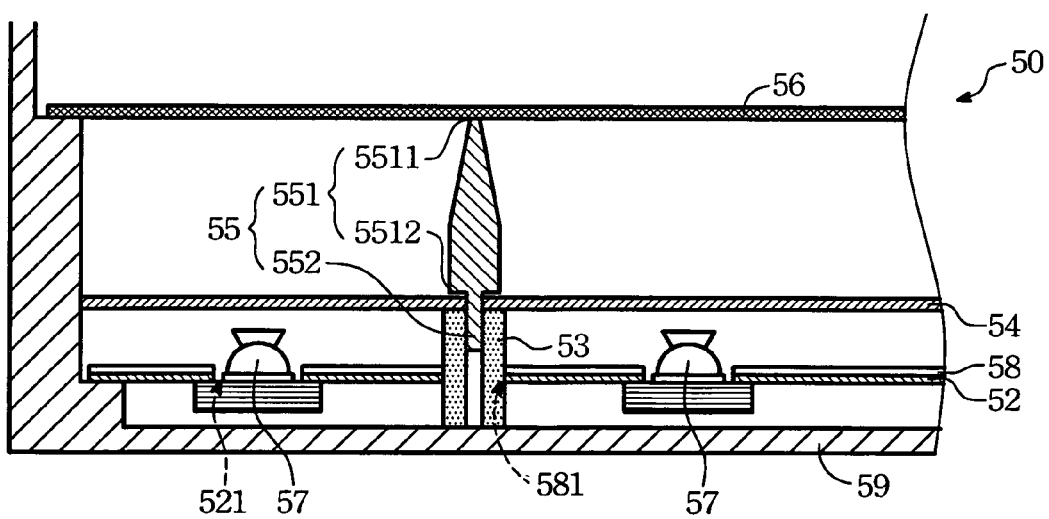
FIG. 4 is a fragmentary sectional view of another preferred embodiment of a bottom lighting module according to the present invention.

Referring to FIG. 4, another preferred embodiment of the bottom lighting module according to the present invention is shown. The bottom lighting module 50 includes a substrate 59, a nut 53, a first diffusion sheet 54, a supportsupport 55, a second diffusion sheet 56 and an LED 57.

The substrate 59 can be a back bezel including a metal plate. The nut 53 is set on the substrate 59 by thrust-pressing or welding. The first diffusion sheet 54 is then set on the nut 53.

Also, the bottom lighting module 50 further comprises a printed circuit board 52 and LEDs 57 disposed on the printed circuit board 52, and both of which are located between the first diffusion sheet 54 and the substrate 59. The reflective plate 58 is adhered onto the printed circuit board 52. The reflective plate 58 and the printed circuit board 52 have common holes 581 for passing the nut 53 to the substrate 59 and for bearing the first diffusion sheet 54.

The supportsupport 55 comprises a body 551 and a screw 552, in which the body 551 comprises a top end 5511 and a bottom face 5512, while the screw 552 is extended downward from the bottom face 5512, then passes through the first diffusion sheet 54, and finally joints with the nut 53. The second diffusion sheet 56 is disposed on the top end 5511 of the body 551.

As stated in the above descriptions, the nut 53 and the supportsupport 55 can provide good support effects to the first diffusion sheet 54 and the second diffusion sheet 56. Certainly, a step-shape or ladder-shape structure to the interior support walls of the bottom lighting module can help to support edges parts of the first diffusion sheet 54 and the second diffusion sheet 56.

As shown in FIG. 4, the LED 57 is set to the hole 521 of the printed circuit board 52 other than the one to pass the nut 53. The light emitted by the LED 57 can be mixed thoroughly by the first diffusion sheet 54 and the second diffusion sheet 56 so as to obtain good mixing effect. Such an arrangement makes the bottom lighting module 50 as an excellent back light-source.

Figure 5:
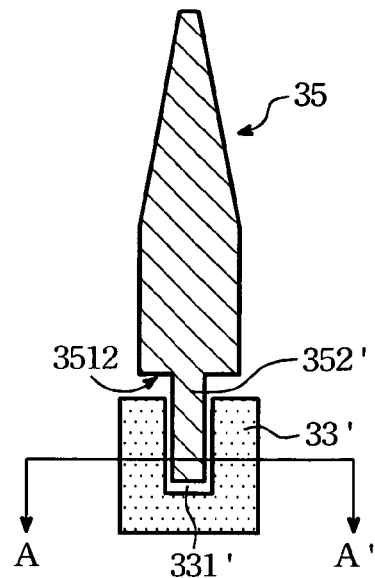
FIGS. 5A~5E are fragmentary sectional views of various embodiments of screw and nut of the a bottom lighting module according to the present invention.
Figure 5:
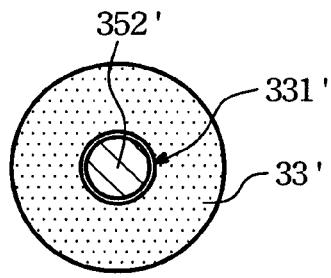
Figure 5:
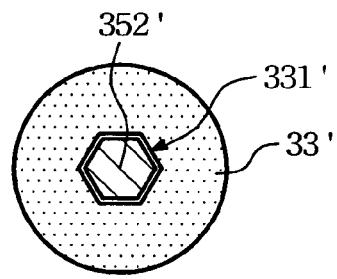
Figure 5:
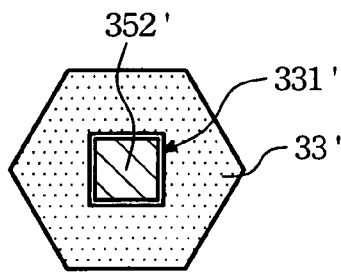
Figure 5:
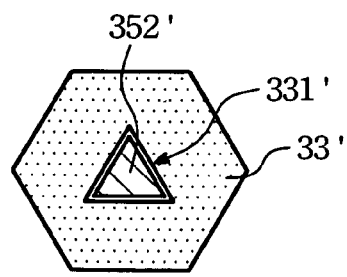

Referring to FIG. 5A, it is another preferred embodiment of the supportsupport 35. In some embodiments of the present invention, the screw 352 of FIG. 3 can be replaced by the pin 352' of FIG. 5A who does not have a threaded part. Also, in the present invention, the nut 33 of FIG. 3 can be replaced by any female part to mate the respective male part, i.e. the female block 33' to mate the male pin 352' in FIG. 352'. In the present invention, the nut or the female block can be generally called as the first combining member, and the screw or the pin can be generally called as the second combining member.

The pin 352' of the FIG. 5A and the female block 33' may be engaged tightly. To achieve such an engagement, the female block 33' is preferred to be made of a metal material while the pin 352' can be made of a plastic material. Therefore, the dimension aperture of the female block 33' can be made smaller than that of the pin 352'.

Nevertheless, a loose pair between the pin 352' and the female block 33' is anyway an acceptable embodiment of the present invention.

Referring to FIG. 5B through FIG. 5E, fragmentary sectional views of various embodiments of the screw and the nut for the bottom lighting module according to the present invention are shown. As shown, the cross section of the pin 352' (i.e. the screw) can be a circle (FIG. 5B), a hexagon (FIG. 5C), a rectangle (FIG. 5D), or a triangle (FIG. 5E). Respectively, the corresponding cross section of the aperture 331' of the female block 33' (i.e. the nut) should be a circle (FIG. 5B), a hexagon (FIG. 5C), a rectangle (FIG. 5D), or a triangle (FIG. 5E). Also, the pin 352' as well as the aperture 331' of the female block 33' can be threaded or non-threaded.

As described above, this invention meets two major tendencies of the current liquid crystal display industry: (1) a larger size and (2) an LED light-source. Also, the present invention avoids possible dents in the first diffusion sheet and the second diffusion sheet of the bottom lighting module, such that the even lightness can be provided. Further, by combining the nut and the screw, this invention makes a simple assembly feasible in both the localizing and the mounting.

I claim:

1. A bottom lighting module, comprising:
    a substrate;
    a first combining member disposed on the substrate;
    a first diffusion sheet supported by the first combining member;
    a support, having a body and a second combining member, the body including a top end and a bottom face, the second combining member being extended from the bottom face and passing through the first diffusion sheet to engage with the first combining member;
    a second diffusion sheet supported by the top end of the body; and
    at least one light-emitting diode (LED) disposed below the first diffusion sheet.

2. The bottom lighting module according to claim 1, wherein said substrate is a printed circuit board and the at least one LED is associated with the printed circuit board.

3. The bottom lighting module according to claim 2, further comprising a back bezel disposed below the printed circuit board.

4. The bottom lighting module according to claim 2, further comprising a reflective plate disposed on the printed circuit board.

5. The bottom lighting module according to claim 4, wherein said reflective plate having a hole adapted to accommodate the first combining member.

6. The bottom lighting module according to claim 1, wherein said substrate is a back bezel.

7. The bottom lighting module according to claim 6, wherein said back bezel is composed of a metal plate.

8. The bottom lighting module according to claim 6, further comprising a printed circuit board having a hole adapted to accommodate the first combining member, wherein the at least one LED is associated therewith and the printed circuit board is disposed between the diffusion sheet and the substrate.

9. The bottom lighting module according to claim 8, further comprising a reflective plate disposed on the printed circuit board.

10. The bottom lighting module according to claim 9, wherein said reflective plate has a hole adapted to accommodate the first combining member.

11. The bottom lighting module according to claim 1, wherein said bottom face and the first combining member are spaced apart from each other by a distance ranging from 0.01 mm to 5 mm.

12. The bottom lighting module according to claim 1, wherein said first diffusion sheet has a hole adapted to accommodate the second combining member.

13. The bottom lighting module according to claim 1, wherein said second combining member is a pin.

14. The bottom lighting module according to claim 1, wherein said first combining member is a nut.

15. The bottom lighting module according to claim 1, wherein said first combining member has a hole jointing with the second combining member, a cross section of the second combining member and an aperture of the first combining member for receiving the second combining member have a shape selected from the group consisting of a circle, a hexagon, a square, and a triangle.

16. A bottom lighting module, comprising:
    a back bezel;
    a nut disposed on the back bezel;
    a first diffusion sheet supported by the nut;
    a printed circuit board, having a hole for passing the nut, being disposed between the back bezel and the first diffusion sheet;
    at least one light-emitting diode (LED) associated with the printed circuit board;
    a support having a body and a screw, the body including a top end and a bottom face, the screw being extended from the bottom face and passing through the first diffusion sheet to joint with the nut; and
    a second diffusion sheet supported by the top end of the body.

17. A bottom lighting module, comprising:
    a back bezel;
    a printed circuit board disposed on the back bezel;
    at least one light-emitting diode (LED) associated with the printed circuit board;
    a nut disposed on the printed circuit board;
    a first diffusion sheet supported by the nut;
    a support having a body and a screw, the body including a top end and a bottom face, the screw being extended from the bottom face and passing through the first diffusion sheet to engage with the nut; and
    a second diffusion sheet supported by the top end of the body.

* * * * *